United States Patent [19]

Bayles et al.

[11] 4,007,816

[45] Feb. 15, 1977

[54] PORTABLE SALVAGE LIFT APPARATUS

[75] Inventors: John H. Bayles; Theodore J. Roster, both of Oxnard, Calif.

[73] Assignee: The United States of America as represented by the Secretary of the Navy, Washington, D.C.

[22] Filed: Aug. 28, 1975

[21] Appl. No.: 608,436

Related U.S. Application Data

[62] Division of Ser. No. 505,815, Sept. 13, 1974, Pat. No. 3,940,814.

[52] U.S. Cl. ............................................. 188/290
[51] Int. Cl.² ........................................ B16D 57/06
[58] Field of Search ................ 188/270, 272, 290; 9/8, 9; 417/337, 333

[56] References Cited

UNITED STATES PATENTS 3,598,208  8/1971  Bronder ............................ 188/290

*Primary Examiner*—Trygve M. Blix
*Assistant Examiner*—Gregory W. O'Connor
*Attorney, Agent, or Firm*—Richard S. Sciascia; Joseph M. St.Amand; Darrell E. Hollis

[57] ABSTRACT

A portable salvage lift apparatus for use in an underwater environment comprising a buoyancy system having a variable lift capability and a tethering system employing a brake whereby the rate of ascent of the apparatus is controlled.

6 Claims, 5 Drawing Figures

PORTABLE SALVAGE LIFT APPARATUS

This is a division of application Ser. No. 505,815 filed Sept. 13, 1974 now U.S. Pat. No. 3,940,814.

BACKGROUND OF THE INVENTION

1. Field of the Invention

The invention relates generally to underwater salvage lift system, and more particularly to such system employing controlled buoyancy devices and a tether system having brake mechanisms.

2. Description of the Prior Art

Many devices have been utilized by divers to salvage objects from the ocean bottom. These range from plastic bags to inverted buckets that generally have been inflated or buoyed up by filling the device with scuba air from breathing gas bottles. No control was provided.

Recently, rigid devices have been provided having zipper closures which can be used to regulate lift capability by allowing excess gas to spill at any setting of the zipper slide. Some of these rigid devices have been provided with self-contained air supplies, generally limited. However, these rigid body devices are large and bulky, hence, difficult to handle by divers. Also, they have no means by which their rate of ascent can be controlled. As a result, injuries to surface objects and personnel often occur.

SUMMARY OF THE INVENTION

The present invention is an apparatus for use in underwater salvage operations having a variable lift capability and a tethering system employing a braking system whereby the rate of ascent of the apparatus is controlled. In one embodiment of the present invention, a collapsible inflation bag having a zipper-controlled buoyancy mechanism is attached to a housing. A source of compressed gas is employed to inflate the inflation bag. A reel having a line wound thereon one end of which is affixed to the bottom serves as a tether mechanism. Attached to the reel is an impeller of a water pump having a restricted outlet whereby the rate of rotation of the reel is slowed down, hence, slowing the ascent of the apparatus.

Accordingly, one object of the present invention is to control the rate of ascent of the salvage apparatus.

Another object of the present invention is to provide controlled buoyancy to the apparatus.

Another object of the present invention is to provide protection for surface objects and personnel.

Another object of the present invention is to provide a low cost, efficient, reliable, easy to operate salvage apparatus.

Other objects and a more complete appreciation of the present invention and its many attendant advantages will develop as the same becomes better understood by reference to the following detailed description when considered in connection with the accompanying drawings in which like reference numerals designate like parts throughout the figures thereof and wherein.

DETAILED DESCRIPTION OF THE PREFERRED EMBODIMENT

Figure 1:
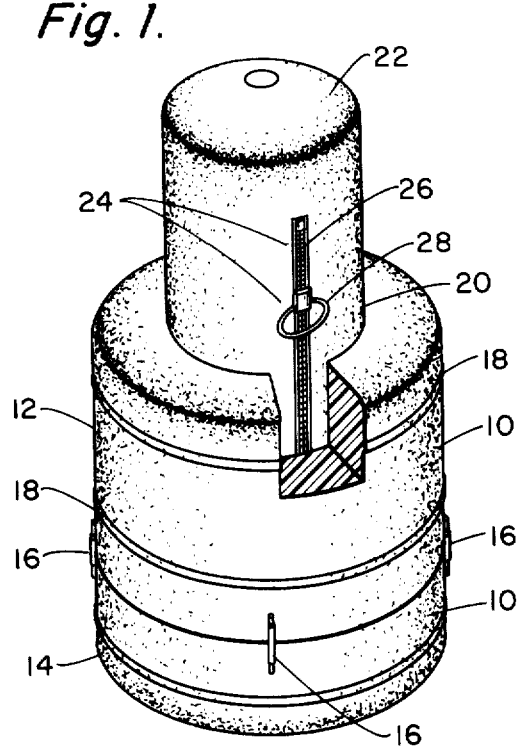
FIG. 1 is an isometric view of one embodiment of the present invention illustrating the housing and inflatable bag.

Turning to FIG. 1, a housing 10 is shown having an upper part 12 and a lower part 14. Latches 16 hold upper and lower parts 12 and 14 together. Housing 10 is also provided with resilient bumper rings 18. Housing 10 is fabricated of fiberglass in the embodiment shown but can be fabricated from any suitable lightweight metal or plastic material.

Upper part 12 has an aperture 20 therein. Connected to housing 10 and located in aperture 20 is collapsible inflation bag 22. Collapsible inflation bag 22, when inflated, projects above housing 10. Inflation bag 22 may be fabricated of a suitable material. Such suitable materials are numerous in the art.

Incorporated in one side of the cylindrical portion of inflation bag 22 is a venting mechanism 24 comprising a zipper 26, which incorporates a pull mechanism 28 having a central hole therein. As the zipper pull mechanism 28 is moved toward and away from housing 10, the gas level in inflation bag 22 is caused to vary, thereby varying the degree of buoyancy. Zipper 26 on both sides of pull mechanism 28 is closed so that the only vent to ambient pressure is through pull mechanism 28. Venting mechanism 24 may be fabricated from a metal or plastic material suitable for underwater usage. It is noted that stainless steel is compatible with a salt water environment and would be a suitable material for underwater use.

Figure 2:
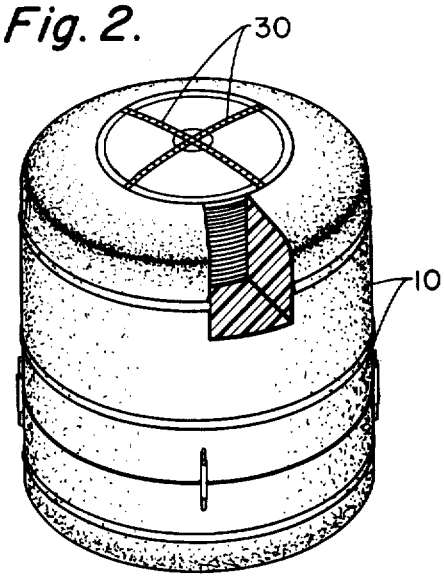
FIG. 2 is an isometric view of one embodiment of the present invention illustrating the collapsible capability of the inflatable bag.

Now turning to FIG. 2, housing 10 is illustrated with collapsible bag 22 in its collapsed mode. A pair of removable retainer straps 30 are utilized to prevent collapsible bag 22 from projecting outward from housing 10.

Figure 3:
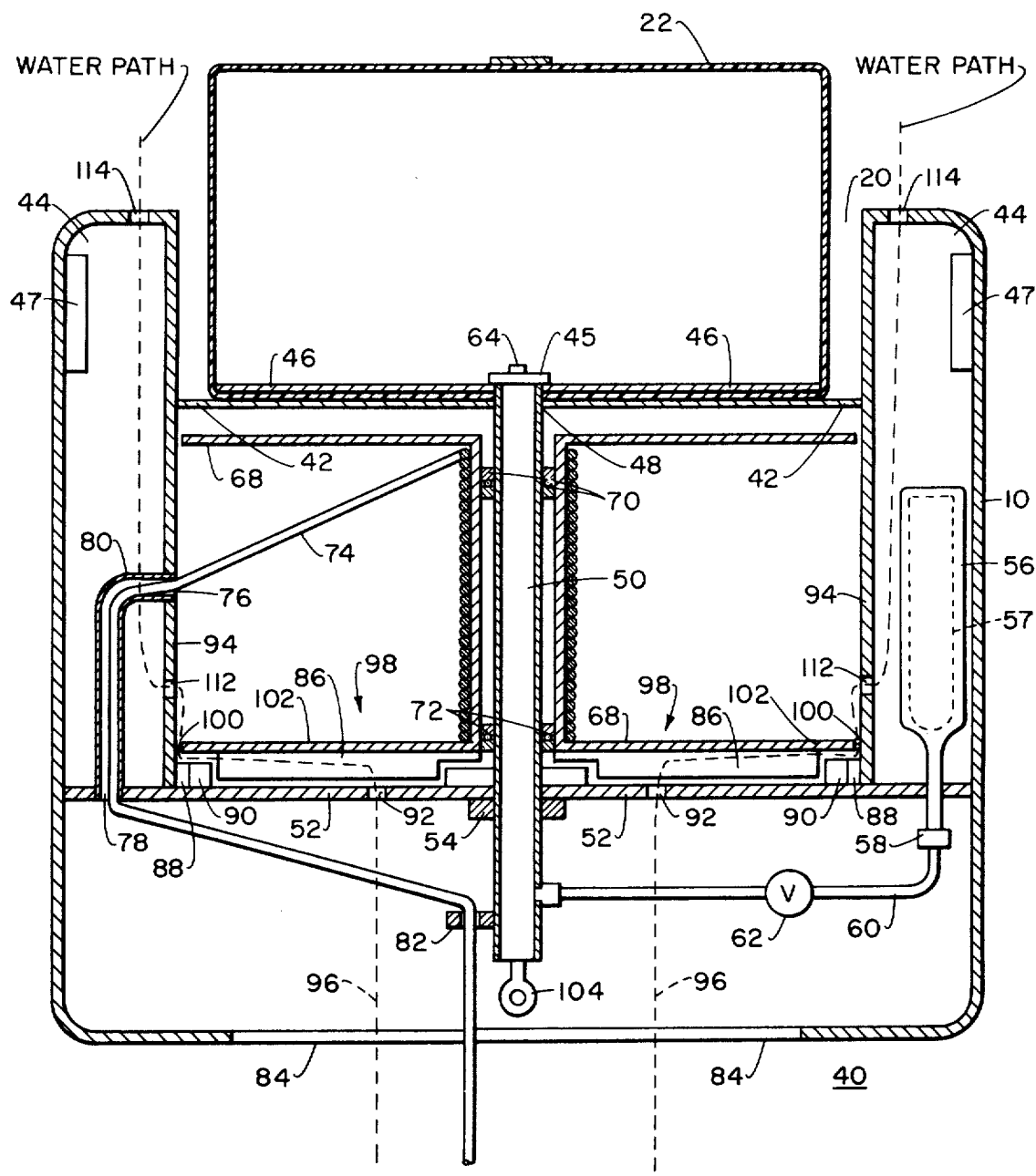
FIG. 3 is a section view of one embodiment of the present invention.

Turning to FIG. 3, underwater lift salvage apparatus 40 is shown in section view. Housing 10 contains aperture 20 which has a plate 42 integral to housing 10 forming the bottom of aperture 20. Housing 10 contains spaces 44 in which commercially available buoyancy materials 46 may be disposed to render apparatus 40 positively or negatively buoyant.

Inflation bag 22 is affixed to plate 42 by disposing a clamping ring spindle centering spider 45 into the bottom of inflation bag 22 and bolting spider 45 to load transfer ring 46. Both spider 45 and ring 46 are inside inflation bag 22.

Plate 42 has an aperture 48 therein through which spindle 50 projects. Spindle 50 is connected to spider 45. Spindle 50 extends downward through plate 52. Spindle 50 is bolted to plate 52 via flange member 54, thereby clamping inflation bag 22 to plate 42. It is noted that the connection of spindle 50 to inflation bag 22 is gas-tight.

Spindle 50 is hollow, thereby providing a section of an air path from gas bottle 56 to inflation bag 22. The inflation gas from bottle 56 passes through pressure regulators and manifolding 58 and through pipe 60 to spindle 50. Attached to pipe 60 is inflation gas hand control 62. Thus, an air-tight path is formed from bottle 56 to inflation bag 22. Located on spider 45 is air check valve 64. Of course, retainer straps 30 have been removed in the embodiment of FIG. 3. Bottle 56 contains a replaceable gas element 57.

A reel 68 is also connected to spindle 50 via bearings 70 and 72 whereby reel 68 is free to rotate about spindle 50. Wound on reel 68 is line 74 which exits reel 68 and penetrates housing 10 through opening 76. Connected between housing opening 76 and housing opening 78 is line guide tunnel 80. Line 74 passes through tunnel 80 and then extends over to line guide 82 attached to spindle 50. From line guide 82, line 74 exits housing 10 through opening 84. It is envisioned that the end of line 74, passing outward from housing 10, will be affixed to the bottom or to an object in the water.

Figure 5:
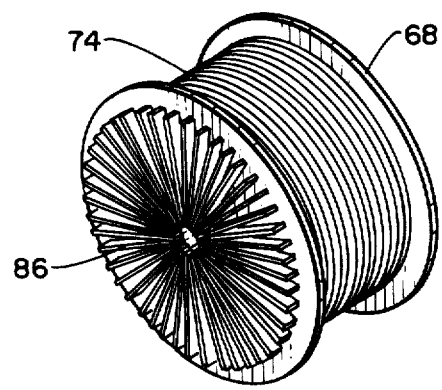
FIG. 5 is an isometric view of the reel and impeller of FIG. 3.

Attached to the underside of reel 68 are impeller blades 86. FIG. 5 illustrates impeller blades 86 from an isometric view. Stator ring 88 and stator blades 90 are attached to plate 52 and surround the edge of impeller blades 86. It is noted that stator ring 88 may be considered part of housing 10. Plate 52 contains water inlet holes 92. Plate 52 with water inlet holes 92, impeller blades 86, reel 68, stator ring 88, stator blades 90, and wall 94 form a water pump unit 98. An outlet opening 100 is formed by stator ring 88, wall 94, and the lower flange 102 of reel 68. Outlet opening 100 chokes down the flow of water through water pump 98 since outlet opening 100 is formed with a close tolerance fit, i.e. the cross-sectional area of outlet opening 100 is much smaller than the cross-sectional area of inlet opening 92. As an example, inlet holes 92 may be approximately 18.84 square inches in cross-sectional area while outlet opening 100 may be approximately 7.76 square inches in cross-sectional area. The ratio of cross-sectional area of inlet holes 92 to outlet opening 100 is approximately 2.42. This restriction or close tolerance fit of outlet opening 100 results in an energy expenditure or a slowing force being exerted on impeller blades 86 and transmitted to reel 68. The path of water through water pump 98 is shown by dotted lines 96 in FIG. 3. Water exits housing 10 through ports 112 and 114. Thus, water pump 98 serves as a brake for slowing the rate of rotation of reel 68 as apparatus 40 ascends to the surface when inflation bag 22 renders apparatus 40 positively buoyant.

One end of line 74 may be attached to an underwater object, thereby tethering apparatus 40 from the object. When apparatus 40 is rendered positively buoyant, apparatus 40 ascends in the water. As apparatus 40 ascends, line 74 unwinds from reel 68. This rate of ascent, if unchecked, may cause damage to surface objects, personnel, or objects being carried by apparatus 40. In order to prevent any unfortunate accidents, water brake 98 controls the rate of ascent of apparatus 40. Of course, the setting of pull mechanism 28 is also a factor in determining the rate of ascent of apparatus 40. In addition, collapsible inflation bag 22 provides a soft bumper in case apparatus 40 does collide with a surface object. Of course, water brake 98 can be alternately disposed other than as depicted in FIG. 3, e.g. water pump 98 could be separated from reel 68 and driven through a gear assembly between reel 68 and water pump 98.

It is noted that alternative to reel 68 rotating about spindle 50, reel 68 may be rigidly affixed to spindle 50, thereby causing apparatus 40 to rotate or spin in the water as it ascends.

Attached to the lower end of spindle 50 is load ring 104.

Figure 4:
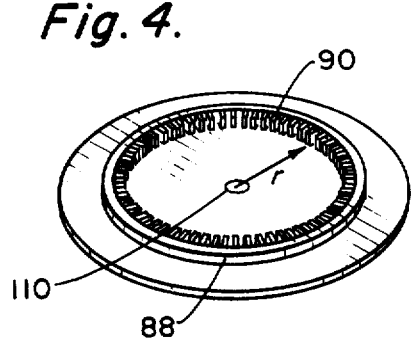
FIG. 4 is an isometric view of the stator blades of FIG. 3.

FIG. 4 illustrates stator ring 88 and stator blades 90. Each stator blade 90 is disposed to be coincident with a radius line drawn from the center 110 of spindle 50 at a distance r from center 110. Stator blades 90 terminate the rotational movement imparted to the water by impeller blades 86. This has the effect of increasing the slowing force exerted on reel 68 via impeller blades 86.

It is envisioned that all metal parts of the operating mechanism are formed of stainless steel which is compatible with a salt water environment. Also, it will be appreciated by those skilled in the art that such necessary and suitable water-proofing materials are provided where needed.

Obviously many modifications and variations of the present invention are possible in light of the above teachings. It is therefore to be understood that within the scope of the appended claims the invention may be practiced otherwise than as specifically described herein.

We claim:
1. A braking apparatus for imparting a slowing force to a rotating member located underwater comprising:
a water pump having a housing inlet means, restricted outlet means and an impeller rigidly connected to said rotating member whereby the water passing through said water pump exerts a slowing force on said rotating member due to forces created on said impeller when said water pump attempts to expel water through said restricted outlet means, said impeller including impeller blades rigidly attached to a flange that is rigidly attached to said rotating member, said flange forming an upper portion of said water pump housing, said upper portion of said water pump housing being capable of rotating with respect to a lower portion of said water pump housing.

2. The apparatus of claim 1 wherein said water pump further comprises:
means disposed between said impeller and said outlet means for terminating the rotational movement imparted to the water exiting said impeller before the water passes through said outlet means, thereby increasing the slowing force imparted to said rotating member.

3. The apparatus of claim 2 wherein said means for terminating rotational movement comprises a plurality of stator blades attached to said lower water pump housing, the water passing into said water pump through said inlet means, then passing through said impeller, then through said stator blades, and out through said restricted outlet means.

4. The apparatus of claim 1 wherein said inlet means are disposed in said lower water pump housing and said outlet means is formed by the space between said lower water pump housing and said flange.

5. The apparatus of claim 1 wherein said water pump further comprises:
means disposed between said impeller and said outlet means for terminating the rotational movement imparted to the water exiting said impeller before the water passes through said outlet means, thereby increasing the slowing force imparted to said rotating member.

6. The apparatus of claim 5 wherein said means for terminating rotational movement comprises:
a plurality of stator blades attached to said water pump housing.

* * * * *